United States Patent [19]

Light et al.

[11] Patent Number: 5,393,716
[45] Date of Patent: Feb. 28, 1995

[54] PROCESS FOR PRODUCING ANTI-BLOCKING COMPOSITIONS

[75] Inventors: David L. Light; Christopher D. Paynter, both of Cornwall, United Kingdom

[73] Assignee: ECC International Limited, United Kingdom

[21] Appl. No.: 127,000

[22] Filed: Sep. 24, 1993

[30] Foreign Application Priority Data

Sep. 25, 1992 [EP] European Pat. Off. ............ 92308754

[51] Int. Cl.$^6$ ...................... C04B 33/04; C04B 14/10
[52] U.S. Cl. .................... 501/141; 501/145; 501/150; 106/416; 106/484; 106/486; 106/482; 241/23; 241/26
[58] Field of Search ............... 106/401, 416, 484, 486, 106/487; 501/141, 145, 150; 241/23, 26, 27

[56] References Cited

U.S. PATENT DOCUMENTS

| | | |
|---|---|---|
| 3,014,836 | 12/1961 | Proctor, Jr. |
| 3,754,712 | 8/1973 | Cecil |
| 4,118,245 | 10/1978 | Hamill et al. |
| 4,118,246 | 10/1978 | Horzepa et al. ............ 501/147 |
| 4,381,948 | 5/1983 | McConnell et al. |
| 4,830,673 | 5/1989 | Jones et al. ............ 501/146 |
| 5,000,871 | 3/1991 | Minayoshi et al. |
| 5,011,534 | 4/1991 | Berube et al. ............ 106/416 |
| 5,028,268 | 7/1991 | Ince et al. ............ 106/416 |
| 5,261,956 | 11/1993 | Dunaway et al. ............ 106/416 |

FOREIGN PATENT DOCUMENTS

| | | |
|---|---|---|
| 284684 | 11/1990 | Germany . |
| 54-057562 | 5/1979 | Japan . |
| 98013 | 10/1989 | Romania . |
| 2199572A | 7/1988 | United Kingdom . |

OTHER PUBLICATIONS

ECC International Ltd. publication, "HyPerformers for the Plastic Industry InFilm Anti-blocking Agents" (1990) no month.

*Primary Examiner*—Mark L. Bell
*Assistant Examiner*—Michael Marcheschi
*Attorney, Agent, or Firm*—Klauber & Jackson

[57] ABSTRACT

There is disclosed a process for preparing a filler composition suitable for incorporation in a polyester film-forming material, which process comprises the following steps:

(a) calcining a crude kaolin clay under conditions such that the calcined product comprises particles consisting of aggregates of fine kaolin platelets;

(b) suspending the calcined clay product from step (a) in water containing a dispersing agent for the calcined clay, so as to form a suspension containing from 40% to 70% by weight of dry calcined clay;

(c) subjecting the suspension formed in step (b) to comminution by attrition grinding with a particulate grinding medium for a time sufficient to reduce the average diameter of the aggregate particles to within the range from 0.3 $\mu$m to 0.9 $\mu$m, and to ensure that the calcined clay is substantially free of particles having an equivalent spherical diameter larger than 5 $\mu$m; and (d) heating the suspension of comminuted calcined clay formed in step (c) to a temperature in the range from 80° C. to 100° C. to drive off water by evaporation, a liquid glycol being added at the same time as the water is driven off to keep the volume of the suspension substantially constant. The process produces a product which has good anti-blocking characteristics, making it useful for incorporation in organic polymer film materials.

14 Claims, 1 Drawing Sheet

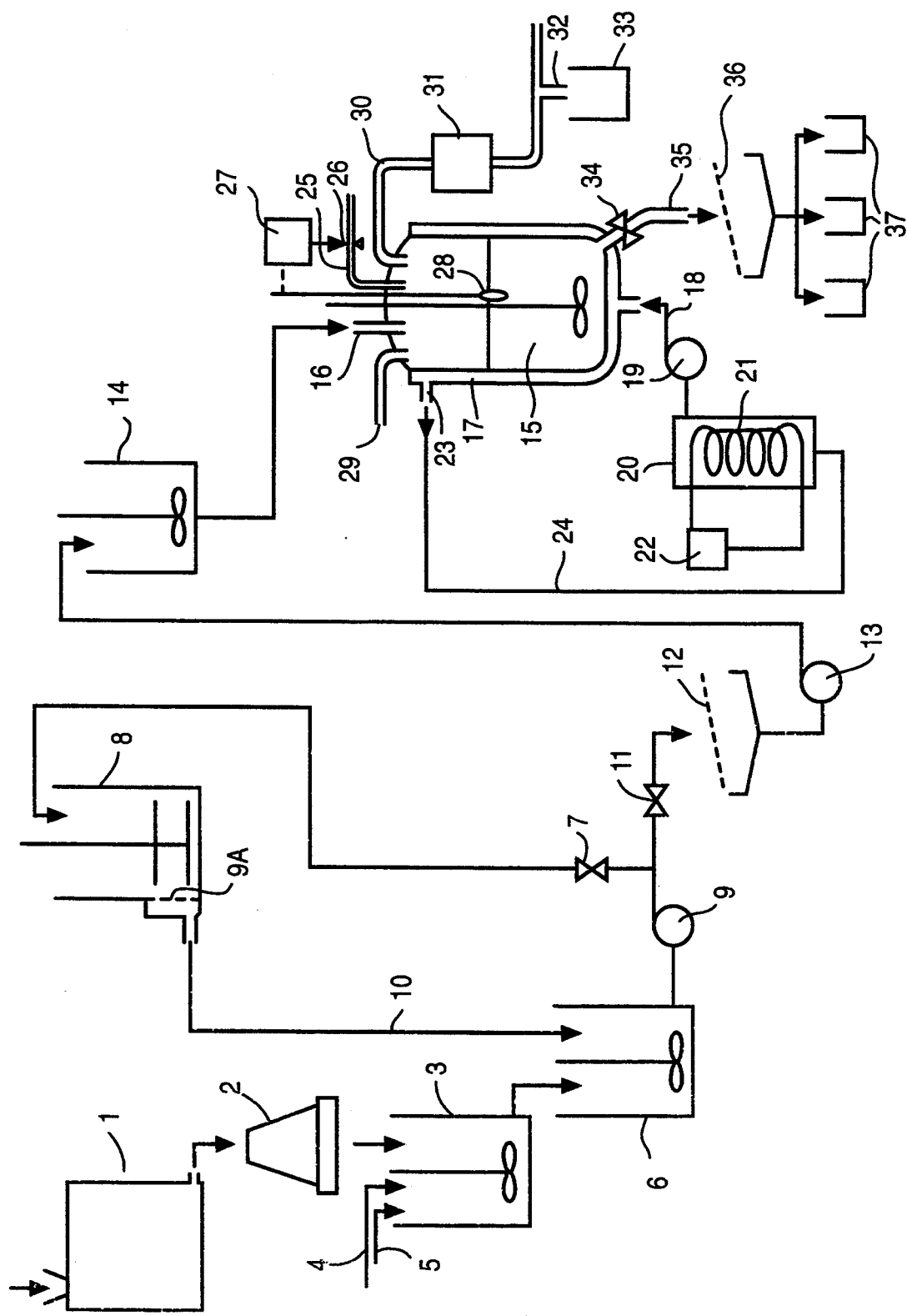

PROCESS FOR PRODUCING ANTI-BLOCKING COMPOSITIONS

This invention relates to a process for producing anti-blocking compositions, that is compositions which are incorporated in organic polymer film materials for the purpose of reducing the coherence of adjacent layers of film produced from the material. The organic polymer film material may be, for example, of the vinyl, cellulose, polyolefin or polyester type.

Film materials often have very smooth surfaces and if two layers of such film material are superimposed one upon the other there is a strong tendency for them to stick together or to "block". This tendency is specially serious if the film is to be used in the form of a tape wound on a reel because adjacent turns of tape may cohere. This problem is usually avoided by incorporating in the film material a finely divided particulate solid material which introduces a degree of surface roughness which will greatly reduce the cohesion between adjacent layers of tape. The particulate solid material is generally known as an "anti-blocking" agent, and may be, for example, a clay mineral, either in a hydrous or calcined form, a natural or synthetic aluminosilicate, a silica or a calcium carbonate.

By a clay mineral in a "hydrous form" we mean a clay mineral which has not been calcined, or which, more specifically, has not been heated to a temperature above about 450° C.

Anti-blocking agents are especially important in the production of magnetic recording tape, which generally comprises a polyester film-forming material containing particles of a suitable ferromagnetic material. One of the most widely used polyester materials is poly(ethylene terephthalate) and a suitable anti-blocking agent for this material has been found to be a hydrous kaolin clay which is prepared to have a narrow particle size distribution such that the particles predominantly have an equivalent spherical diameter (e.s.d.) which is between 0.5 $\mu$m and 3 $\mu$m. Whilst such a clay is suitable for use as an anti-blocking agent for audio recording tape it has been found that for video recording tape the use of a somewhat finer anti-blocking agent is advantageous. The anti-blocking agent is generally commercially available in the form of a dry powder which is suspended in ethylene glycol at the point of use before incorporation in the poly(ethylene terephthalate) composition. However, it has been found that the finer types of anti-blocking agent tend to agglomerate during the drying operation so that the particle size distribution of the material suspended in the ethylene glycol is less fine than it was before drying and pulverising and it is necessary to subject the suspension to a lengthy and expensive membrane filtration operation in order to remove all particles and agglomerates having a diameter larger than about 5 $\mu$m.

Ideally, an anti-blocking agent should have a very narrow particle size distribution. In other words all its particles should have substantially the same size. It is possible to approach this ideal situation if the anti-blocking agent is produced by a chemical precipitation process, but this method of production tends to make the anti-blocking agents prohibitively expensive for the purpose for which they are required. Ground or naturally fine minerals are cheaper to produce, but, unless special precautions are taken, tend to have a wider distribution of particle sizes.

According to the present invention, there is provided a process for preparing a filler composition suitable for incorporation in a polyester film-forming material, which process comprises the following steps:

(a) calcining a crude kaolin clay under conditions such that the calcined product comprises particles consisting of aggregates of fine kaolin platelets;

(b) suspending the calcined clay product from step (a) in water containing a dispersing agent for the calcined clay, so as to form a suspension containing from 40% to 70% by weight of dry calcined clay;

(c) subjecting the suspension formed in step (b) to comminution by attrition grinding with a particulate grinding medium for a time sufficient to reduce the average diameter of the aggregate particles to within the range from 0.3 $\mu$m to 0.9 $\mu$m, and to ensure that the calcined clay is free of particles having an equivalent spherical diameter larger than 5 $\mu$m; and (d) heating the suspension of comminuted calcined clay formed in step (c) to a temperature in the range from 80° C. to 100° C. to drive off water by evaporation, a liquid glycol being added at the same time as the water is driven off to keep the volume of the suspension constant.

When a filler composition with a fine calcined kaolin clay is required, the particle size distribution of the aggregate particles resulting from step (a) should be such that at least 80% by weight of the aggregate particles have an equivalent spherical diameter smaller than 2 $\mu$m.

In step (a) the calcined kaolin clay preferably has a particle size distribution such that at least 90% by weight of the aggregate particles have an equivalent spherical diameter smaller than 2 $\mu$m. Advantageously the calcined kaolin clay is prepared in accordance with the process described in U.S. Pat. No. 4,381,948. Calcined clay produced in accordance with the process disclosed in that specification consists predominantly of aggregate particles which each consist of clusters of kaolin platelets each of which has an equivalent spherical diameter generally not greater than 1 $\mu$m.

In step (b) the dispersing agent used may be a water soluble salt of a polysilicic acid, a water soluble condensed phosphate salt or a water soluble salt of a polymer or copolymer of an $\alpha,\beta$-monoethylenically unsaturated organic acid. Specially preferred as dispersing agents for this purpose are water soluble salts of poly(acrylic acid) or poly(methacrylic acid) having a number average molecular weight less than 10,000. The amount of the dispersing agent required is generally in the range from 0.05% to 5% by weight, based on the weight of dry calcined kaolin clay.

In step (c) the calcined clay is preferably comminuted by agitating the suspension formed in step (b) in an attrition grinding mill with a particulate grinding medium consisting of hard particles having average diameters in the range from 0.1 mm to 2.0 mm. Especially suitable as the grinding medium are substantially spherical particles of silica sand having diameters in the range from 0.5 mm to 1.0 mm. In order to achieve the required degree of fineness of the comminuted calcined kaolin clay it is necessary to dissipate in the suspension up to 5000 kJ of energy per kg of dry calcined kaolin clay. This amount of energy is conveniently dissipated in the suspension by continuously recirculating the suspension through the attrition grinding mill until the required energy input has been achieved. The attrition grinding mill is provided with a screen having an aperture size such that the particulate grinding medium is retained in the mill but the suspension of calcined kaolin clay is able to pass through. The suspension of calcined clay to be comminuted is held in a suitable holding vessel from which it is pumped through the mill at a suitable rate, the suspension which flows out of the mill through the screen being returned to the holding vessel. This recirculation is continued until the required amount of energy has been dissipated in the suspension. During the grinding step some water may be lost from the suspension through evaporation caused by a rise in temperature resulting from the dissipation of energy in the suspension.

In step (d) the liquid glycol is preferably ethylene glycol. The suspension of the comminuted calcined kaolin clay is preferably maintained at a temperature in the range from 90° C. to 98° C. in a double-walled vessel having an outer jacket through which is circulated water at or near its boiling point. Liquid glycol is added through a conduit closed by a valve which is opened when the level of liquid in the vessel falls below a predetermined level through the evaporation of water. Preferably a liquid level sensor is provided in the vessel so that the valve can be opened automatically when the level in the vessel falls below a given level and closed to interrupt the supply of glycol when the level has risen to above the given level.

BRIEF DESCRIPTION OF THE DRAWINGS

For a better understanding of the present invention and to show how the same may be carried into effect, reference will now be made, by way of example, to the accompanying drawing which illustrates one embodiment of equipment suitable for carrying out the process of the present invention.

In the apparatus shown in the drawing, there is an independently-fired multiple hearth calciner 1, the output of which communicates with a dry roller mill 2, the output of which leads to a tank 3 provided with a stirrer. Leading into tank 3 are a conduit 4 (supplying water) and a conduit 5 (for supplying a solution of dispersion agent). The output from tank 3 is fed to a stirred tank 6. In an output pipe from tank 6 is a pump 9 which can feed the outgoing material through a valve 7 to a grinding mill 8. Grinding mill 8 includes a screen 9A and downstream of screen 9A is a conduit 10 for feeding material back to tank 6.

Between pump 9 and valve 7 is a branch in which is located another valve 11, such branch leading to a screen 12 from which particles which pass through screen 12 can be pumped by a pump 13 to a stirred tank 14, the contents of which can be transferred to a reaction vessel 15 via an inlet 16. Reaction vessel 15 has a hot water jacket 17 to which hot water may be supplied through a conduit 18 via a pump 19. Pump 19 takes an output from a hot water tank 20, in which the water is heated by a coil 21 through which is passed steam from a steam generator 22. Jacket 17 is provided with an outlet 23 leading to a conduit 24 which serves to feed tank 20 via conduit 24.

Leading into reaction vessel 15 is a conduit 25 (for feeding liquid ethylene glycol), conduit 25 being provided with an on/off valve 26 actuated in response to a controller 27. Located in reaction vessel 15 is a liquid sensor 28 capable of providing information for the controller 27.

Also leading into reaction vessel 15 is an inlet 29 (for air) and a conduit 30 (for removing water vapor and ethylene glycol vapor). Conduit 30 is provided with a condenser 31 having an output provided with a branch conduit 32 leading to a collection vessel 33 for condensate. Leading from a lower region of reaction vessel 15 is an outlet conduit 35 provided with a valve 34 which leads to a screen 36 below which are containers 37.

The process was conducted in the illustrated equipment in the following way.

A kaolin clay from Georgia, U.S.A. was beneficiated and subjected to particle size separations to yield a fine fraction having a particle size distribution such that substantially 100% by weight of the particles had an equivalent spherical diameter smaller than 1 $\mu$mm, and this fine fraction was dewatered, dried and milled to break up any agglomerates and this dried, milled clay was fed to an indirectly-fired multiple hearth calciner 1 which was operated under conditions such that all the clay was raised to a temperature in excess of 900° C. but substantially none of it was exposed to a temperature greater than 1100° C. The average residence time of the kaolin clay in the calciner was about ½ hour. After cooling, the calcined clay was subjected to milling in a dry roller mill 2 in order to break up any gross agglomerates, i.e. greater than about 10 $\mu$m. The pulverised calcined clay was then transferred to a stirred tank 3 to which was also supplied water through a conduit 4 and a solution of a dispersing agent through a conduit 5. The dispersing agent was a sodium polyacrylate having a number average molecular weight of about 3,000 and was added in the amount of 0.3% by weight, based on the weight of dry calcined clay. Water was added in an amount sufficient to form a suspension containing about 42% by weight of dry calcined kaolin. When the suspension was thoroughly mixed it was conveyed to a second stirred tank 6. A valve 7 was then opened and the suspension contained in the stirred tank 6 was circulated through an attrition grinding mill 8 by means of a pump 9. The attrition mill was charged with silica sand having substantially spherical grains of diameters in the range from 0.5 mm to 1.0 mm, and, as suspension was continuously supplied from the tank 6, a suspension of ground calcined clay flowed out of the mill through a screen 9A of aperture size 0.25 mm, which retained the grains of sand while allowing the suspension of calcined clay to pass, and returned to the tank 6 through a conduit 10. The circulation of the suspension through the attrition grinding mill was continued until about 3600 kJ of energy per kg of dry calcined clay had been dissipated in the suspension. This amount of energy was found to be sufficient to ensure that the ground calcined clay was substantially completely free of particles having an equivalent spherical diameter greater than 5 $\mu$m and had a mean particle diameter in the range from 0.3 $\mu$m to 0.9 $\mu$m.

When the calcined clay was sufficiently finely ground, the valve 7 was closed and a valve 11 was opened and the suspension of ground calcined clay was passed through a screen 12 of aperture size 53 $\mu$m in order to remove any coarse particles or agglomerates and was then transferred by means of a pump 13 to a stirred tank 14. From the tank 14 the suspension of fine calcined clay was introduced into a stirred reaction vessel 15 through an inlet 16. The reaction vessel 15 was provided with a hot water jacket 17 to the bottom of which hot water at a temperature near to 100° C. was supplied through a conduit 18 by means of a pump 19. The hot water was supplied from a hot water tank 20 in which the water was heated by means of a coil 21 through which was passed steam which was supplied from a steam generator 22. The hot water jacket 17 was provided with an outlet 23 at the top through which water returned to the hot water tank 20 by a conduit 24. Liquid ethylene glycol was fed to the reaction vessel 5 through a conduit 25 in which was provided an on/off valve 26 which was actuated in response to a signal emitted from a controller 27. The level of liquid in the reaction vessel 15 was monitored by a level sensor 28. When the level of the liquid fell below a given line the controller 27 emitted a signal to open the valve 26. Similarly when the level rose above a given line the controller closed the valve 26. During the process of replacing the water in the suspension with liquid ethylene glycol, air was blown into the reaction vessel 15 through an inlet 29 and water vapour and ethylene glycol vapour were displaced through a conduit 30. A condenser 31 was provided in this conduit and the condensate flowed through a branch conduit 32 and was collected in a vessel 33.

When the water in the suspension had been replaced by ethylene glycol to the extent that the water content was reduced to about 5% by weight, a valve 34 was opened and the suspension was discharged from the reaction vessel 15 through an outlet 35. The suspension was passed through a screen 36 of aperture size 44 μm to remove any agglomerates or coarse particles and was collected in suitable containers 37 for storage and transport.

The process of the present invention is illustrated by the following Example.

EXAMPLE

A calcined clay from Georgia, U.S.A., having an initial particle size distribution as shown in the table below, was subjected to wet grinding by agitation with a particulate grinding medium to give a product the particle size distribution of which is also shown in the Table. For the purpose of the wet grinding the calcined kaolin clay was mixed with sufficient water to form a suspension containing 42% by weight of dry calcined clay and 0.3% by weight, based on the weight of dry calcined clay, of a sodium polyacrylate dispersing agent having a number average molecular weight of about 3000. Considerable heat was generated during the grinding and the temperature of the suspension rose, causing evaporation of water. As a result the solids content of the suspension had increased to 50% by weight by the completion of the grinding.

The aqueous suspension of ground calcined clay was divided into two portions A and B. Portion A was subjected to spray drying to produce a free flowing dry product in the form of microspheres. Portion B was heated in the reaction vessel and the temperature was maintained at about 95° C. Water was continuously driven off by evaporation and was continuously replaced by ethylene glycol to maintain a substantially constant volume of suspension in the vessel and hence a substantially constant solids content of about 50% by weight of dry calcined clay. Heating of the suspension was continued until the liquid medium consisted of approximately 95% by weight of ethylene glycol and 5% by weight of water. At these proportions an azeotrope is formed between ethylene glycol and water and it is not feasible to reduce the percentage by weight of water further.

The percentage by weight of particles having an equivalent spherical diameter respectively larger than 10 μm, smaller than 1 μmm, and smaller than 0.5 μm was measured for the calcined kaolin clay before and after grinding and after spray drying (Portion A) and as suspended in the ethylene glycol/water medium (Portion B). The results obtained are set forth in the Table below:

TABLE

| Material | % by weight of particles | | |
|---|---|---|---|
| | larger than 10 μm esd | smaller than 1 μm esd | smaller than 0.5 μm esd |
| Initial calcined clay | 0.02 | 90 | 70 |
| Wet ground calcined clay | 0.10 | 99 | 88 |
| Spray dried product (Portion A) | 2.8 | 87 | 68 |
| Suspended in ethylene glycol (Portion B) | 0.10 | 99 | 88 |

It can be seen that the spray dried product (Portion A) is severely agglomerated while there is no evidence of agglomeration in the material suspended in the ethylene glycol/water medium (Portion B).

We claim:
1. A process for preparing a filler composition suitable for incorporation in a polyester film-forming material, which process comprises the following steps:
   (a) calcining a crude kaolin clay under conditions such that the calcined product comprises particles consisting of aggregates of fine kaolin platelets;
   (b) suspending the calcined clay product from step (a) in water containing a dispersing agent for the calcined clay, so as to form a suspension containing from 40% to 70% by weight of dry calcined clay;
   (c) subjecting the suspension formed in step (b) to comminution by attrition grinding with a particulate grinding medium for a time sufficient to reduce the average diameter of the aggregate particles to within the range from 0.3 μm to 0.9 μm, and to ensure that the calcined clay is free of particles having an equivalent spherical diameter larger than 5 μm; and
   (d) heating the suspension of comminuted calcined clay formed in step (c) to a temperature in the range from 80° C. to 100° C. to drive off water by evaporation, a liquid glycol being added at the same time as the water is driven off to keep the volume of the suspension constant.

2. A process according to claim 1, wherein the particle size distribution of the aggregate particles resulting from step (a) should be such that at least 80% by weight of the aggregate particles have an equivalent spherical diameter smaller than 2 μm.

3. A process according to claim 2, wherein in step (a) the calcined kaolin clay has a particle size distribution such that at least 90% by weight of the aggregate particles have an equivalent spherical diameter smaller than 2 μm.

4. A process according to claim 1, wherein in step (b) the dispersing agent is selected from the group consisting of a water soluble salt of a polysilicic acid, a water soluble condensed phosphate and a water soluble salt of a polymer or copolymer of an α,β-monoethylenically unsaturated organic acid.

5. A process according to claim 4, wherein the dispersing agent is selected from the group consisting of water soluble salts of poly(acrylic acid) and poly(methacrylic acid) having a number average molecular weight less than 10,000.

6. A process according to claim 1, wherein the amount of dispersing agent is in the range from 0.05% to 5% by weight, based on the weight of dry calcined kaolin clay.

7. A process according to claim 1, wherein in step (c) the calcined clay is comminuted by agitating the suspension formed in step (b) in an attrition grinding mill with a particulate grinding medium consisting of hard particles having average diameters in the range from 0.1 mm to 2.0 mm.

8. A process according to claim 7, wherein the grinding medium is spherical particles of silica sand having diameters in the range from 0.5 mm to 1.0 mm.

9. A process according to claim 1, wherein, during the comminution, there is dissipated in the suspension up to 5000 kJ of energy per kg of dry calcined kaolin clay.

10. A process according to claim 9, wherein the energy dissipation is effected by continuously recirculating the suspension through the attrition grinding mill until the required energy input has been achieved.

11. A process according to claim 10, wherein the attrition grinding mill is provided with a screen having an aperture size such that the particulate grinding medium is retained in the mill but the suspension of calcined kaolin clay is able to pass through.

12. A process according to claim 1, wherein in step (d), the liquid glycol is ethylene glycol.

13. A process according to claim 1, wherein, in step (d), the suspension of the comminuted calcined kaolin clay is maintained at a temperature in the range from 90° C. to 98° C. in a double-walled vessel having an outer jacket through which is circulated water at or near its boiling point.

14. A process according to claim 13, wherein liquid glycol is added through a conduit closed by a valve which is opened when the level of liquid in the vessel falls below a level through the evaporation of water.

* * * * *